United States Patent Office 3,598,547
Patented Aug. 10, 1971

3,598,547
EXTRACTING SODIUM AND POTASSIUM FROM AQUEOUS SOLUTIONS HAVING A pH OF 14 USING PHENOLS AND AN EXTRACTANT ADDITIVE
Robert R. Grinstead, Walnut Creek, Calif., assignor to The Dow Chemical Company, Midland, Mich.
No Drawing. Filed Feb. 3, 1969, Ser. No. 796,160
Int. Cl. B01d 11/04; C01d 1/04, 1/34
U.S. Cl. 23—312
4 Claims

ABSTRACT OF THE DISCLOSURE

The disclosure concerns a novel process for producing purified aqueous solutions of sodium or potassium hydroxide from impure aqueous solutions of the corresponding bases. The process comprises contacting an aqueous solution of sodium or potassium values with a water-immiscible organic liquid comprising hindered and unhindered phenols, an organic carrier liquid, and an extractant additive. The resulting two phase system is separated into the component aqueous and organic phases and the organic phase is contacted with water to yield the hydroxide solution.

BACKGROUND OF THE INVENTION

Heretofore aqueous solutions of cesium values have been obtained by selective extraction of cesium from aqueous solutions of cesium also comprising rubidium and/or potassium ions. The aqueous solution is contacted with a water-immiscible organic phase containing a "hindered" phenol and an organic carrier liquid. Upon contact, the cesium phenolate is preferentially formed, and when the organic and aqueous phases are separated, the cesium phenolate remains in the organic phase while the rubidium and/or potassium remain largely in the aqueous raffinate. The "loaded" organic phase is generally contacted with an aqueous acid and a purified aqueous solution of the corresponding cesium salt results.

The "hindered" phenols employed in the cesium process must be substituted in the ortho position, i.e., in the two and/or six positions on the phenol nucleus. Hindered phenols are also described where, in addition to ortho substitution, there is substitution at intermediate positions, and especially at the para position. The substituent groups are generally alkyl or halogen.

In attempting to extract sodium and/or potassium cations from aqueous hydroxide solutions, the hindered phenols are relatively inefficient. Unexpectedly it has been discovered that efficient extraction can be obtained where the organic phase comprises certain extraction additives in addition to the hindered phenol and the organic carrier liquid. Optionally "unhindered" phenols can be employed in place of the "hindered" phenol to obtain equally efficient or even improved extraction. Such "unhindered" phenols are not substituted in either of the 2 or 6 ring positions, but are substituted in at least one of the remaining positions on the phenol nucleus.

SUMMARY OF THE INVENTION

One embodiment of the present invention is the process comprising contacting an aqueous phase comprising potassium or sodium cations and impurities such as chlorate, chloride, and sulfate anions, and iron, with a water immiscible organic phase. This initial contacting is sometimes hereinafter referred to as the extraction step. The organic phase is characterized as comprising a substituted phenol, an extraction additive and a water-immiscible organic carrier liquid. Following the extraction step, the phases are separated, and the organic phase is contacted with water to form a relatively pure solution of sodium or potassium hydroxide. This latter contacting step is sometimes referred to as the stripping step. The hydroxide solution is then separated from the sodium or potassium-depleted organic phase. If desired, the solid hydroxide can be isolated by evaporation of the water of the solution.

The phenols employed, whether hindered or unhindered, are benzene-derived, i.e., benzenoid phenols. The phenols are substituted with halogen or hydrocarbon moieties. The phenols must be substantially insoluble in water while being soluble in the carrier liquid employed. The sodium or potassium phenolate must exhibit solubility behavior similar to that of the phenol. The $pK_a$ (acid dissociation constant) of the phenol must fall within the range of 8 to 13, and preferably from 9 to 11.

The temperatures of the organic phase and the sodium or potassium-containing aqueous phase during the extraction step are not crucial and can vary from about 0° C. to the boiling point of the lower-boiling of the two phases. A preferred temperature range for good extraction efficiency during contacting is from about 20° C. to about 40° C.

The concentration of sodium or potassium cations in the aqueous phase is not critical. However, the aqueous phase must have a pH of at least 12, and preferably higher. As concentrations of sodium and potassium hydroxide increase, a single contact with the "loaded" organic phase may not be enough to extract all of the sodium or potassium cations into the organic phase. Repeated contacts with the organic phase, or use of larger volumes of the organic phase may be necessary to achieve the desired degree of extraction.

During the extraction step, the relative volumes of the contacted phases can vary over a wide range. Efficient separations are obtained where the organic/aqueous ratio by volume of the contacted phases during extraction varies from 1:10 to about 100:1. An optimum ratio is 1:1 to about 5:1.

The time during which the phases are in contact is not crucial. Some extraction of the sodium or potassium cations will be obtained even though the phases are in contact only for a few seconds. As would be expected, the degree of extraction increases as the phases are allowed to remain in contact for longer periods of time. If contacting is carried out with agitation so that the phases become relatively intimately dispersed within one another, extraction efficiency is increased, and contacting times can be reduced.

The concentration of the phenol in the extraction phase will vary depending on the extraction efficiency desired, the type of phenol employed and the conditions during the extraction step. If the concentration is high (in excess of about 2.5 molar) only a few or even one extraction step may be sufficient. If the concentration is relatively low, many extraction steps may be necessary and the efficiency of extraction will be correspondingly low.

The mol ratio of the extractant additive to the phenol in the organic phase can vary greatly depending upon the extraction efficiency desired. With hindered phenols, the ratio of additive/phenol must be at least about 0.2 to achieve significantly improved extraction, and preferably the ratio will be at least about 0.5 for good extraction efficiency. As the amount of carrier liquid is reduced, the mole ratio of additive to phenol may be as high as 10 or more.

Following the extraction step as described above, the cation-loaded organic phase is separated from the aqueous phase. As the phases are immiscible in one another, a two-layer system is readily obtained by allowing the phases to stand undisturbed after any agitation. The separation of the phases can then be perfected by commonly employed liquid-liquid separatory means.

Following phase separation the loaded organic phase is contacted with water to again form a two-phase system. The water acts to "strip" the potassium or sodium cations from the loaded organic phase. Therefore in contacting the water with the organic phase the two-phase system should be agitated so that the phases become intimately dispersed one within the other. The contact time will depend upon the extent of agitation, relative volumes of the phases, and the temperature of the phases. Generally an appreciable amount of cations will be stripped from the organic phase very soon after that phase is contacted with water along with agitation.

The relative volumes of the two phases during "stripping" are not crucial, although it should be remembered that the concentration of the resulting aqueous hydroxide solution is directly related to the volume of the aqueous stripping phase. Therefore, if a relatively concentrated solution is desired, the volume of the aqueous stripping phase should be decreased accordingly. If it is desired to obtain a sodium or potassium salt solution, the loaded organic phase can be stripped with an aqueous acid solution rather than water.

The temperature at which the stripping step is to be carried out can vary greatly. However, the stability of the alkali metal phenolate of the loaded organic phase appears to be reduced as the temperature of the phase is raised. Therefore optimum results can be obtained by "stripping" the loaded organic phase at higher temperatures than were employed in the extraction step. For most systems a minimum stripping temperature of about 20° is advisable and greater stripping efficiency can be obtained by raising the temperature to about 65° C.

Unhindered phenols which can be employed must be substantially insoluble in water. Likewise the sodium or potassium phenolate must exhibit similar solubilities. Suitable unhindered phenols (i.e., unsubstituted in either the 2 or 6 positions) contain at least 1 or 2 substituent groups. The substituent groups are generally halogen, aryl, alkyl, alkaryl or aralkyl groups. The total number of carbon atoms in the substituent groups is from 4 to about 30, with 8 to about 20 being the preferred total number of carbon atoms. No more than about 12 carbon atoms are present per substituent group. The pKa (acid dissociation constant) of suitable unhindered phenols falls within the range of 8 to 13 and preferably is from 9 to 11. An especially preferred class of unhindered phenols is the 3,5-dialkylsubstituted phenols possessing the above-defined characteristics. An example of this class is 3,5-ditert-butylphenol

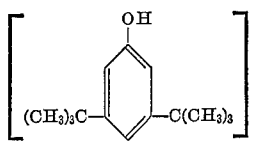

Other suitable unhindered phenols include m-pentadecyl phenol, 3-octyl-4-chloro phenol, 3,4,5-tripropyl phenol, p-(1-butyl)hexyl phenol, and 3-methyl-4-isopropyl phenol.

Hindered phenols must possess the same general properties as the unhindered phenols, i.e., the $pK_a$ values for the hindered phenol must fall within the range of 8–13, and preferably 9–11, and the phenol must conform to the requirements specified above for unhindered phenols such as solubility, size, nature and number of substituent groups.

Suitable "hindered" phenols are for example p-octyl-o-cresol, 2,4-dimethyl-6-t-butyl phenol, 4,4'-isopropylidene-bis-(2-chloro)phenol, and 4-t-octyl-2-phenyl phenol.

Suitable organic carrier liquids must be non-polar, relatively high-boiling, water-immiscible, inert and stable under acidic conditions and especially under basic conditions. The carrier liquid must possess a sufficiently high boiling point, such as above about 50° C., and preferably above about 80° C. so that it is not unduly volatile under the temperature conditions employed in the extraction and stripping steps. Examples of suitable carrier liquids are aromatic hydrocarbons such as benzene, toluene, xylene, and stilbene, or aliphatic (straight chain, branched or cyclic) hydrocarbons with at least 6 carbon atoms per molecule, and mixtures of these aromatic and aliphatic hydrocarbons. Aliphatic and aromatic ethers with at least 6 carbon atoms can be employed. Chlorinated hydrocarbons such as carbon tetrachloride are also suitable carrier liquids. Other suitable carrier liquids are trichloroethylene, phenetole, cumene, diethyl benzene, anisole, cyclohexane, dioctyl ether, and a 40/60 by volume mixture of diphenyl oxide and hexane.

Organic compounds suitable for use as extraction additives should exhibit polarity, i.e., the compound should contain one or more polar groups such as hydroxyl, oxy, amino or cyano (i.e., nitriles). Additionally, the additive should be essentially immiscible with water. The additive also should not be reactive in basic media, i.e., under the alkaline reaction conditions of the process, the additive should not react with other organic molecules present in the organic extractant phase and should not react appreciably with the alkali metal hydroxide of the aqueous phase.

The extraction additive may be monofunctional or polyfunctional and should contain from about 6 to about 30 carbon atoms, with an average of about 4 to 8 carbon atoms per functional group. Generally, the extraction additive will contain at least one functional group independently selected from the class consisting of -oxy(-o-), amino(-NR$_2$), imino (-NR-), cyano (-CN) and aliphatic hydroxyl. Preferably at least one of the functional groups present in a polyfunctional additive will be a hydroxyl group.

Illustrative monofunctional extraction additives include nitriles, alcohols, and amines having from 5 to 8 carbon atoms such as, for example, benzonitrile, caprylonitrile, valerylnitrile, benzonitrile, 1-hydroxypentane, 3-hydroxy-3-methylhexane, 3 - hydroxyhexane, methylbenzylcarbinol, 2 - aminopentane, 4 - aminohexane, N,N-diisopropylamine, N-propyl-N-pentylamine, N-methylaniline, N-ethylaniline, N,N-diphenylamine, 3-nitropentane, diisopropylether, and nitrobenzene.

Illustrative polyfunctional extraction additives are N-butanol, tridecanol, N,N'-dibenzylethylenediamine, N-dodecyl - 1,3 - propanediamine, ethylene glycol-3-heptyl-ether, N-tridecylethanolamine, diethyleneglycol-mononyllether, 2 - butyl - 2 - hexyl - 1,3-propanediol, 2,3-octanediol, ethylene glycol-dibutyl ether and N,N-dimethyl - 2 - ethylcaproamide. Other suitable extraction additives are the p-(t-octyl)-phenyl ether of triethylene glycol, dodecyl alcohol, and octyl 2-aminoethyl ether.

Another embodiment of the invention involves the use of extraction additives such as those described above at such high concentrations that the additive becomes in effect the carrier liquid. In this embodiment, the normal carrier liquids specified herein above are either substantially absent from the organic phase or present in concentrations of less than about 5 weight percent.

Extraction additives especially suitable also as carrier liquids are long-chain water-insoluble, aliphatic polyfunctional organic compounds wherein the functional groups are independently selected from the class consisting of oxy, amino, or hydroxyl. The compounds contain from 8 to 30 carbon atoms, with an average of from 4 to 8 carbon atoms per functional group.

Suitable compounds are, for example, dibutoxy ethane, 1,4 - dipropoxy butane, 1,5 - diamino - 3 - propylpentane, and diols containing from 8 to 20 carbon atoms. Other suitable compounds include n-butanol, n-octanol, diethyleneglycol, and mononyl ether.

The following examples are set forth to illustrate the invention.

EXAMPLE 1

One liter of a solution containing 1 g. mole/liter of 4-secbutyl - 2 - (α-methylbenzyl)-phenol [BAMBP] 1 mole/liter of N-tridecyl ethanolamine in a commercial aromatic hydrocarbon solvent was shaken overnight at ambient temperature with 2 liters of aqueous electrolytic cell effluent containing 8.6 molar NaOH and 16.0% NaCl. The organic phase was centrifuged to remove as much entrained aqueous phase as possible, and then stirred with 250 ml. of distilled water in a water bath held at 60° C. The organic phase was contacted again with a 2-liter portion of cell effluent, and again stripped with water in the same manner. The two water strip samples were combined and analyzed. The results are as follows:

TABLE I

|  | Cell effluent, molar | Product solution, molar |
|---|---|---|
| Percent NaOH | 8.64 | 6.52 |
| Percent NaCl | 16.0 | 0.17 |
| Percent Na$_2$SO$_4$ | 0.089 | 0.01 |
| Percent NaClO$_3$ | 0.0032 | <0.0005 |
| P.p.m. Fe | 0.9 | 1.1 |

The reduction in impurity level, particularly of NaCl, is quite clear.

EXAMPLES 2–12

To ascertain the effect of various extraction additives on the extraction power of a hindered phenol, 1 molar solutions of BAMBP were prepared. The carrier liquid was a solvent composed primarily of aromatic hydrocarbons with a boiling point of from 312° F.–390° F. The concentration of the extraction additive in the organic phase was 1 molar. The aqueous phase had a NaOH concentration of about 2.5 M, and an NaCl concentration of about 2.5 M. The phases were contacted at room temperature (about 25° C.) with moderate agitation. Following separation, the concentration of sodium cation in each phase was determined by potentiometric titration. The results are set forth in Table II.

TABLE II

| Example | Extraction additive | Concentration of Na$^+$ in organic phase, M | Concentration of Na$^+$ in aqueous phase, M |
|---|---|---|---|
| 2 | No additive | 0.0089 | 0.89 |
| 3 | Tridecanol | 0.046 | 0.85 |
| 4 | Ethylene glycol, dibutyl ether | 0.082 | 2.36 |
| 5 | N,N-dibenzyl-ethylene-diamine [1] | 0.24 | 2.28 |
| 6 | Benzonitrile | 0.30 | 2.26 |
| 7 | N-dodecyl-1,3-propane-diamine | 0.34 | 2.16 |
| 8 | Ethylene glycol, mono-3-heptyl ether | 0.51 | 1.99 |
| 9 | N-tridecyl-ethanolamine | 0.56 | 1.97 |
| 10 | Diethylene glycol mononoyl ether | 0.59 | 1.94 |
| 11 | 2,3-octanediol | 0.56 | 1.94 |
| 12 | 2-butyl-2-hexyl-1,3-propanediol | 0.54 | 1.96 |

[1] No NaCl in aqueous phase.

From Table II it can be seen that the concentrations of sodium in the organic phase were increased where an additive was employed.

EXAMPLES 13–22

Solutions of various hindered phenols were prepared. The organic carrier liquid was an aromatic hydrocarbon solvent. The concentration of phenol in the organic phase was about 1 molar. The concentration of the extraction additive (N-tridecylethanolamine) was also about 1 normal. In the aqueous phase the concentration of both NaCl and NaOH was about 2.5 molar. The phases were contacted at about 24° C. The contact time was about 2 minutes. Contacting was carried out with mild agitation to intimately disperse the phases one within the other. After the system had come to equilibrium and the two phases had reformed, the phases were separated and the sodium ion concentration in each stage was determined as an indication of the extraction power of each phenol. The results are set forth in Table III.

TABLE III

| Example | Hindered phenol | pKa of the phenol | Concentration of Na in organic phase, molar | Concentration of Na in aqueous phase, molar |
|---|---|---|---|---|
| 13 | 2-chloro-6-phenyl phenol | Between 8 and 13 | 0.89 | 1.67 |
| 14 | 2-cyclopentyl-4-chloro phenol | do | 0.82 | 2.48 |
| 15 | 4-chloro-2-phenyl phenol | do | 0.89 | 1.64 |
| 16 | 2-benzyl-4-chloropenol | do | 0.82 | 1.77 |
| 17 | 4-chloro-2-cyclohexyl phenol | do | 0.58 | 1.15 |
| 18 | 4-t-butyl-2-phenyl phenol | do | 0.56 | 1.15 |
| 19 | 4-(sec-butyl)-2-(α-methylbenzyl)-phenol | do | 0.33 | 1.53 |
| 20 | 2,6-dioctadecyl-4-methyl phenol | do | 0.025 | 2.45 |
| 21 | 2,6-di-t-butyl phenol | do | 0.01 | 2.51 |
| 22 | 2,4-di-t-butyl phenol | do | 0.007 | 2.49 |

It will be noted that the last three hindered phenols in Table III (Examples 20–22) show relatively poor extracting power. These phenols, are relatively weak acids and would not be expected to extract well from the relatively dilute hydroxide solution used in this experiment. They are also very highly hindered.

In Table III above it can be seen that the extractive power of 2-chloro-6-phenyl phenol is good in the presence of an extraction additive. This same phenol was tested without employing an additive. On contact with the aqueous phase precipitation occurred, indicating that the phenol is inoperative in the absence of an additive.

What is claimed is:
1. A process comprising:
 (a) contacting an impure aqueous phase having a pH of at least 14 and comprising a cation selected from potassium and sodium cations with a water-immiscible organic extractant phase comprising an organic carrier liquid which is a non-polar relatively high boiling organic liquid, water-immiscible, inert and stable under basic conditions, and possesses a boiling point in excess of 50° C., a polar, base-stable, water-immiscible organic compound as an extraction additive which is a water insoluble organic compound containing from 6 to 30 carbon atoms and having at least one functional group and wherein the functional groups are independently selected from the class consisting of ethers, amines, nitriles and alcohols, and wherein the average number of carbon atoms per functional group is 4 to 8 and a substituted, benzene-derived phenol having a pKa of from 8 to 13, is substantially water-insoluble, and contains at least one substituent group selected from the class consisting of halogen, aryl, aliphatic and aralkyl, said substituent groups containing a total of from 4 to 30 carbon atoms with not more than 12 carbon atoms being present in any one substituent group,
 (b) separating the organic and aqueous phases,
 (c) contacting the separated organic extractant phase with water thereby to produce an aqueous solution of sodium or potassium hydroxide, and
 (d) separating the aqueous hydroxide solution from the organic phase.

2. A process as in claim 1 wherein the extraction additive contains at least one aliphatic hydroxyl group.

3. A process as in claim 1 wherein the mole ratio of extractant additive/phenol in the organic phase is at least about 0.2.

4. A process as in claim 1 wherein the extraction additive is a long-chain water-insoluble, aliphatic, polyfunctional organic compound containing from 6 to 30 carbon atoms and wherein the functional groups are independently selected from the class consisting of ethers, amines, or alcohols, and wherein the average number of carbon atoms per functional group is 4 to 8.

References Cited

UNITED STATES PATENTS

| | | | |
|---|---|---|---|
| 3,179,503 | 4/1965 | Horner | 23—312 |
| 3,302,993 | 2/1967 | Bray | 23—312 |
| 3,305,321 | 2/1967 | Teumac | 23—339X |
| 3,415,746 | 12/1968 | Buetow | 23—312X |
| 3,433,583 | 3/1969 | Hess | 23—312X |

FOREIGN PATENTS

| | | | |
|---|---|---|---|
| 509,857 | 7/1955 | Canada | 23—312 |
| 1,013,473 | 12/1965 | Great Britain | 23—312 |

OTHER REFERENCES

O.R.N.L.-3627, October 1964, pp. 187–190, 195–203, 209.

Arnold et al., I. & E.C. Process Design and Development, vol. 4, #3, July 1965, pp. 249 to 254.

Horner et al., Nuclear Science and Engineering, vol. 17, #2, October 1963, pp. 234, 240–244.

WILBUR L. BASCOMB, JR., Primary Examiner

S. J. EMERY, Assistant Examiner

U.S. Cl. X.R.

23—184; 210—38; 260—624